W. C. WELLS.

ROCK DRILL AND WELL BORING MACHINE.

No. 10,731. Reissued June 1, 1886.

Witnesses:
W. C. Jirdinston.
Arthur LeBoutillier.

Inventor:
Willet C. Wells
by Pantzier & Pantzier
his Attorneys.

W. C. WELLS.

ROCK DRILL AND WELL BORING MACHINE.

No. 10,731. Reissued June 1, 1886.

Witnesses:
W. C. Jirdinston.
Arthur L. N. Bontillier.

Inventor:
Willit C. Wells
by Pentinen & Pentinen
his Attorneys.

UNITED STATES PATENT OFFICE.

WILLET C. WELLS, OF TIFFIN, OHIO.

ROCK-DRILL AND WELL-BORING MACHINE.

SPECIFICATION forming part of Reissued Letters Patent No. 10,731, dated June 1, 1886.

Original No. 296,804, dated April 15, 1884. Application for reissue filed November 7, 1885. Serial No. 182,148.

*To all whom it may concern:*

Be it known that I, WILLET C. WELLS, formerly of Ogden, in the county of Boone and State of Iowa, and now of Tiffin, county of Seneca, and State of Ohio, have invented an Improved Rock-Drilling and Well-Boring Machine, of which the following is a specification.

The object of my invention is to save time and labor in prospecting for coal and other minerals, and in boring Artesian wells.

It consists in constructing a portable machine, as hereinafter fully set forth, in such a manner that it can be operated by means of horse-power, steam-engine, or other suitable motors to automatically lift, rotate, and drop a drill fixed on the end of a tube, to thereby form a vertical bore in the ground and through strata of rock and other hard substances, and also at the same time clean the bore, by pumping the detritus from the bottom and discharging it at a distance from the top and mouth of the bore without stopping the drilling process and lifting the drill and tube from the bore at intervals, for the purpose of elevating ground and hard substances comminuted by the action of the drill.

Figure 1:
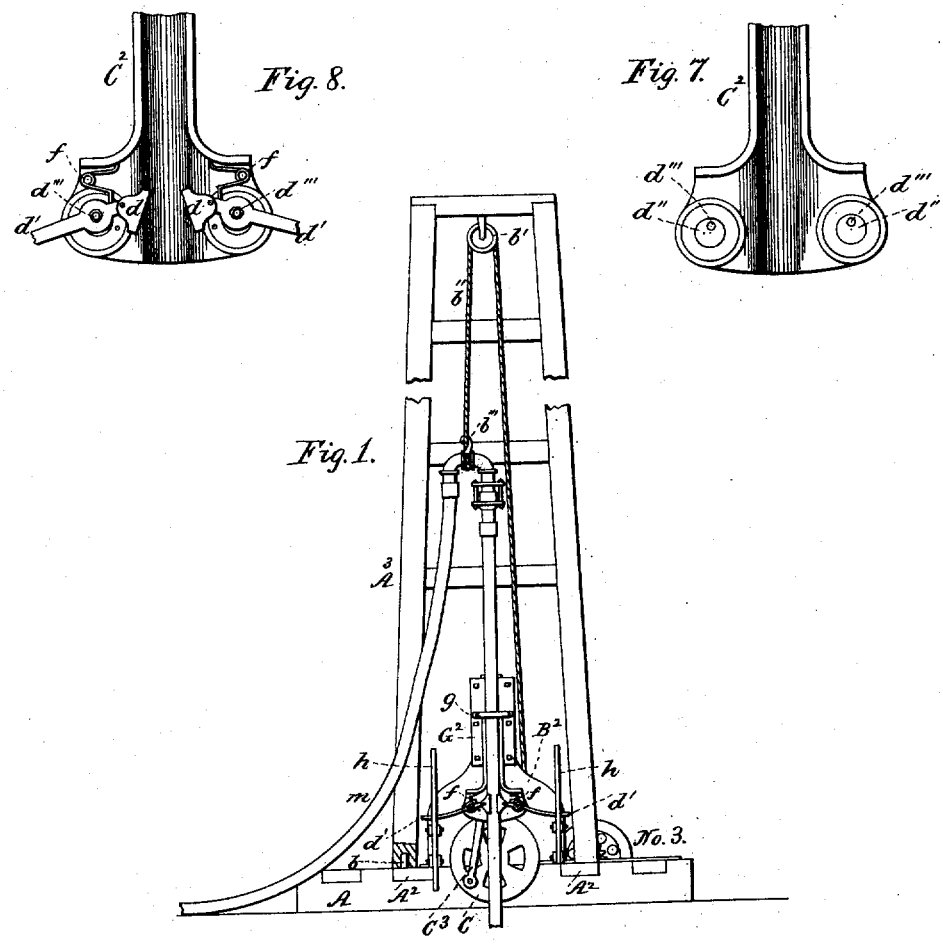
Figure 2:
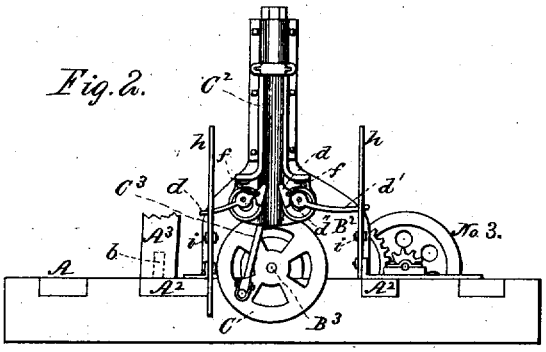
Figure 3:
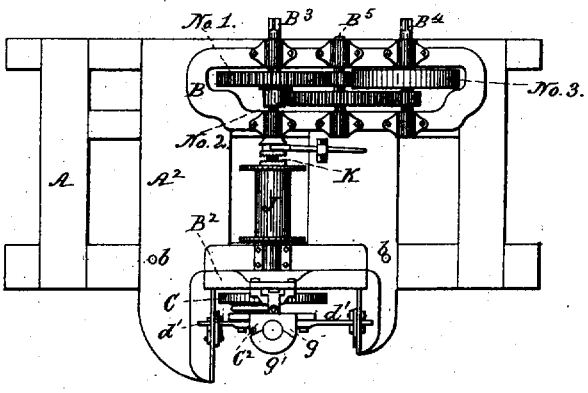
Figure 5:
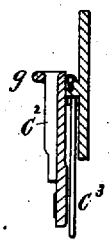
Figure 4:
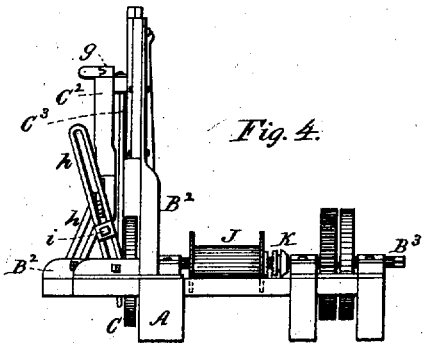
Figure 6:
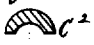

Figure 1 of my accompanying drawings is a front elevation of my complete machine in position for operation. Fig. 2 is an enlarged view of the lower portion of Fig. 1, showing the tube-holding jaws open and the tube and drill removed. Fig. 3 is a top or plan view of my operative mechanism. Fig. 4 is a side view of the drill-operating mechanism. Fig. 5 is a longitudinal section of the vertical portion of Fig. 4. Fig. 6 is a transverse section of my reciprocating jaw-carrier. Figs. 7 and 8 are detail views of my jaw-operating device.

Jointly considered, these figures clearly illustrate the construction, operation, and utility of my complete invention.

A represents the base of my machine, in the form of a frame of wood or other convenient material, adapted to be placed flat upon the ground or a suitable level foundation immediately over the site where a bore is to be made.

$A^2$ are planks fixed across the top of the skeleton base, to support metal frames and operative mechanism.

$A^3$ are the posts of a derrick, detachably connected with the planks and base by means of pins *b*, that are fixed to the base and project upward into corresponding bores formed in the bottoms of the posts, as clearly shown in Fig. 2, or in any suitable way.

*b'* is a pulley in bearings fixed to the top of the derrick.

*b''* is a rope that extends upward from a drum and passes over the pulley *b'*.

*b'''* is a grappling-tongs fixed to the end of the rope, for the purpose of seizing and lifting the tube and drill from the bore, or elevating sections of tubing to be coupled to the upper end of the tube in the bore at intervals, as the depth of the bore is increased.

B (clearly shown in Fig. 3) is a skeleton cast-metal frame adapted to be fixed flat upon the base A $A^2$ by means of screw-bolts, to support horizontal shafts and gearing.

$B^2$ is a frame, which I make of metal, fixed to the base at the front side, to support the driving-shaft and operating mechanism.

$B^3$ is a driving-shaft mounted in bearings formed in or attached to the frames B and $B^2$.

$B^4$ and $B^5$ are shafts mounted in the frame B in parallel position with the driving-shaft $B^3$.

No. 1 is a gear-wheel fixed to the driving-shaft $B^3$.

No. 2 is a gear-wheel fixed to the shaft $B^5$.

No. 3 is a balance-wheel fixed to the shaft $B^4$.

No. 4 is a pinion fixed to the shaft $B^4$.

No. 5 is a pinion fixed to the shaft $B^5$.

C is a crank-wheel fixed on the end of the shaft $B^3$, that extends through an opening in the frame $B^2$.

$C^2$ is a reciprocating jaw-carrier that slides vertically in a bearing formed in or fixed to the front face of the frame $B^2$.

$C^3$ is a pitman that connects the jaw-carrier with the crank-wheel.

*d d* are T-shaped jaws that have concave faces adapted to engage a tube or round drill-stock. These tube-gripping jaws are hinged to the ends of levers *d'*, and the said levers are pivoted to the front face and opposite sides of the jaw-carrier $C^2$, by means of adjustable eccentrics *d''*, that have pivots *d'''* projecting outward and screw-bolts projecting inward, and that are inserted in circular cavities formed in the face of the carrier and detachably connected with the jaw-carrier, and with the cavities on the bearings.

*f f* are metal springs fixed to the face of the jaw-carrier, and also fixed to the levers $d'$, by being placed in cavities in the bearings $d''$ in such a manner that they will, in their normal condition, press upon the bearings $d''$, to aid in keeping the pivoted jaws $d$ engaged with the drill-stock in its upward motions, and in holding the jaws $d$ upward and apart when disengaged from the drill-stock. It will be readily seen that for this purpose it is important that the springs press upon the levers at their bearing-points, so as to pass those bearings in the oscillations of the lever. They were intended to be so described by me in my original application in the following language, to wit:

*f f* are metal springs, formed and fixed to the levers $d'$, and placed in cavities of the bearings $d''$, as clearly shown in Fig. 8, in such a manner that they will in their normal condition hold the jaws $d$ upward and apart when disengaged from the drill-stock and closed when engaged with the drill-stock, as required to lift it. They have always been so made by me, both before and since said application, and this part of the description was without my personal knowledge dropped out of my specification after it was placed on file.

The drawing correctly shows the construction of the springs and mode of applying them, except that they are shown as pressing upon the levers at a point in front of the bearings, instead of over the bearings, as they have always been made by me, and were intended to have been shown in that drawing.

*g* is an open eye and tube-bearing formed on or fixed to the top of the jaw-carrier $C^2$.

$g'$ is a hinged section formed and attached to the open ring or eye in such manner that it can be closed and fastened to aid in retaining a tube or drill-stock in a vertical position, and readily opened to facilitate the removal of a tube-section from the machine.

*h h* are bridles detachably and adjustably connected with the forward projections of the case of the metal frame $B^2$ by means of clamping-screws $h'$, or in any suitable way to receive and govern the levers $d'$.

*i i* are metal slides adjustably connected with the bridles $h$, to restrict the descent of the long arms of the levers $d'$ relative to the bridles in which they are operated.

J is a drum placed loosely upon the driving-shaft $B^3$.

*k* is a sliding clutch upon the same shaft, by means of which the drum J is fixed to the shaft and rotated to operate the rope $b''$ when attached thereto, as required in raising and lowering tube-sections or elevating the tube and drill from the bore.

*m* is a flexible tube attached to the top of the drill-tube *r*, to convey water and dirt from the tube and bore. The two parts are connected by means of a coupling or joint that will allow the tube *r* to rotate while the tube *m* is stationary.

In the practical operation of my machine thus constructed I place it in position, as indicated by Fig. 1, and then, by means of a horse-power or other suitable motor, impart a rotary motion to the driving-shaft B and the crank-wheel C on its end, to thereby transmit power and a reciprocating motion to the jaw-carrier $C^2$. At each upward motion of the jaw-carrier the jaws $d$ will clamp fast to the tube between them, and carry it and the drill on its lower end upward until the long arms of the levers $d'$, to which the jaws are hinged, strike the upper ends of the bridles $h$, when the said long arms are depressed, and the grip of the jaws upon the tube thereby relaxed, to allow the tube to drop and by force of gravity operate the drill to form a bore in the center of a cavity previously made in the surface of the ground and filled with water. As the jaw-carrier descends at each revolution of the crank-wheel, the downward motion is arrested and restricted by the slides $i$ on the bridles $h$. It is therefore obvious that the length of the stroke of the drill and the tube can be readily regulated by simply shifting the crank-pin, and raising and lowering the bridles relative to the frame and the slides or stops $i$ relative to the bridles $h$.

To change the position of the drill-point at each successive blow, I simply incline the bridles $h$ in opposite directions relative to each other, so that they will, in combination with the levers $d'$, perform the function of a spiral cam groove or screw in rotating the jaw-carrier the fractional part of a revolution at each of its upward motions, to turn the tube and drill accordingly in the bore before it is dropped to strike a blow.

Until the drill reaches a water-bearing stratum it will be necessary to keep an artificial supply of water in the bore, to aid in carrying up the pulverized substances from the bottom of the bore and out of the way of the drill-point, by means of a check-valve in the bottom of the tube, as it is reciprocated in the bore, to perform the function of a lift-pump in elevating liquid matter from the bore.

I have described this machine as a portable machine, and consider it desirable that it should be so constructed as to be readily removable. I do not intend to represent its portability to be an essential part of the invention, since it is obvious that it relates to features which are concerned in the operation of the drill, rather than in the transportation of the machine.

I claim as my invention—

1. The reciprocating jaw-carrier having opposed jaws supported thereon by means of levers pivotally connected to said carrier, to the inner ends of which said jaws are pivotally attached, said levers being so balanced as to exert a constant stress against the opening of said jaws when positively tripped inward, for the purpose described.

2. In combination with the reciprocating jaw-carrier, levers pivotally supported thereon bearing opposed jaws so attached to their inner ends, respectively, as to oscillate thereon, and springs operating upon said levers to press said jaws inward during the upward movement of said carrier, for the purpose described.

3. In combination with the reciprocating jaw-carrier, levers pivotally supported thereon bearing opposed jaws so attached to their inner ends, respectively, as to oscillate thereon, and so balanced as to exert a constant stress against the opening of said jaws when positively tripped inward, and a similar stress against the closing of said jaws when positively tripped outward, for the purpose described.

4. In combination with the reciprocating jaw-carrier, levers pivotally supported thereon bearing opposed jaws so attached to their inner ends, respectively, as to oscillate thereon, trips serving to throw said jaws alternately together and apart during the successive reciprocations of said carrier, and springs bearing upon said levers above the fulcrum-point, serving to press said jaws together when thrown inward, and to hold them apart when tripped in the opposite direction, for the purpose described.

5. The combination of a reciprocating jaw-carrier, jaw-bearing levers pivotally attached thereto and having jaws pivotally mounted thereon, a crank operating the jaw-carrier, and trips for throwing the jaws alternately into and out of engagement, for the purpose described.

6. In combination with the reciprocating jaw-carrier having its opposed jaws pivotally mounted on levers and alternately thrown into and out of engagement by the contact of said levers with trips at opposite ends of the movement of said carrier, an eye or loop mounted on said carrier and serving to guide and support the drill, for the purpose described.

7. The combination of the reciprocating jaw-carrier with the opposed jaws mounted thereon, the crank imparting movement to said carrier, the drum loosely mounted on the driving-shaft of said crank, and a clutch for throwing said drum into engagement, for the purpose described.

8. A portable base, A, the metal frames B and $B^2$, the driving-shaft $B^3$, the crank-wheel C, and a reciprocating jaw-carrier, $C^2$, arranged and combined in a drilling-machine, substantially as shown and described, to opperate in the manner set forth, for the purposes specified.

9. The levers $d'$, having jaws hinged to their ends, in combination with a reciprocating jaw-carrier, $C^2$, and bridles $h$, adjustably connected with the base of a drilling-machine, substantially as and for the purposes set forth.

10. The T-shaped jaws $d$, the levers $d'$, the adjustable eccentrics $d''$, and the springs $f$, arranged and combined with the reciprocating jaw carrier $C^2$, substantially as shown and described, for the purposes specified.

11. The jaw-carrier $C^2$, having an open ring, $g$, and a hinged section, $g'$, at its top, and carrying a pair of levers, $d'$, having tube-gripping jaws on their ends, in combination with a base or frame, $B^2$, having adjustable bridles $h$, substantially as shown and described, for the purposes specified.

12. The adjustable slides or stops $i$, in combination with the bridles $h$ and a reciprocating jaw-carrier having pivoted jaw-bearing levers extending their long arms through the said bridles, substantially as and for the purposes specified.

13. The improved rock-drilling and well-boring machine composed of the following named elements and subcombinations, to wit: the portable base A $A^2$, the frames B and $B^2$, the driving-shaft $B^3$, having a crank-wheel on one end and a gear-wheel on the other, the shaft $B^1$, having a balance-wheel and pinion, the reciprocating jaw-carrier having a tube-bearing, $g$ $g'$, at its top, and carrying tube-gripping mechanism $d$ $d'$ $d''$ $f$, the adjustable bridles $h$, having adjustable slides $i$, the detachable derrick having a pulley and rope, $b'$ $b''$, a drum, J, and a clutch, $k$, substantially as shown and described.

WILLET C. WELLS.

Witnesses:

GEO. D. LOOMIS,

J. H. REDGELY.